US006365732B1

(12) United States Patent
Van Thorre

(10) Patent No.: US 6,365,732 B1
(45) Date of Patent: Apr. 2, 2002

(54) PROCESS FOR OBTAINING STEREOISOMERS FROM BIOMASS

(75) Inventor: Doug Van Thorre, Minneapolis, MN (US)

(73) Assignee: Sweet Beet Incorporated, Minneapolis, MN (US)

( * ) Notice: Subject to any disclaimer, the term of this patent is extended or adjusted under 35 U.S.C. 154(b) by 0 days.

(21) Appl. No.: 09/613,411

(22) Filed: Jul. 10, 2000

(51) Int. Cl.$^7$ .............................................. C08B 11/00
(52) U.S. Cl. ............................ 536/84; 536/36; 536/37; 536/55.1; 536/124; 536/125; 536/126; 536/127; 536/128; 435/158; 435/163; 435/800
(58) Field of Search .......................... 536/36, 37, 55.1, 536/124, 125, 126, 127, 128, 84; 435/158, 163, 800

(56) References Cited

U.S. PATENT DOCUMENTS

| 4,136,207 A | 1/1979 | Bender ....................... 426/510 |
| 5,254,258 A | 10/1993 | Pirkle et al. ................. 210/643 |
| 5,290,440 A | 3/1994 | Pirkle et al. ............. 210/198.2 |
| 5,411,594 A | * 5/1995 | Heikkila et al. ............ 435/158 |
| 6,004,518 A | 12/1999 | Green ........................ 422/190 |
| 6,027,241 A | 2/2000 | King ....................... 366/181.5 |

* cited by examiner

Primary Examiner—W. Gary Jones
Assistant Examiner—Janell E. Taylor
(74) Attorney, Agent, or Firm—Schwegman, Lundberg, Woessner & Kluth, P.A.

(57) ABSTRACT

The present invention includes a process for extracting a stereoisomer fro biomass. The method comprises providing biomass and subjecting the biomass to substantially instantaneous pressurization and depressurization to separate cellulose, hemicellulose, and lignin from the biomass. The hemicellulose is hydrolyzed to form hemicellulose hydrolysates. The hydrolysates are separated using chromatography.

29 Claims, 4 Drawing Sheets

PROCESS FOR OBTAINING STEREOISOMERS FROM BIOMASS

BACKGROUND OF THE INVENTION

The present invention relates to a method for extracting and purifying stereoisomers from biomass. The present invention also relates to a method for extracting and purifying L-arabinose from sugar beet pulp.

Drug and fine chemical feed stocks have been produced to exacting physical and chemical purity standards or chirality. However, little regard has been given to optical purity. Achieving optical purity requires identifying feed stock components that have stereoisomers and selecting D- or L-forms of chemicals that have stereoisomers. The D- and L-forms are known as stereoisomer pairs, i.e. right and left handed pairs. Stereoisomers are molecules that are identical in atomic constitution, and that have, in some instances essentially identical physical and chemical properties. The stereoisomeric pairs differ in three dimensional arrangement of atoms, optical rotation, and chemical properties.

One type of stereoisomer pair is an enantiomer. An enantiomer is a stereoisomer pair with at least one asymmetric center. Individual stereoisomers of an enantiomer are mirror images of each other. Drugs tend to have enantiomers that have activity which is biologically distinguishable. In some instances, individual enantiomers of drugs have distinguishable biological activity. Naturally occurring, optically impure, or racemic mixtures of stereoisomers have been used as feed stocks in the pharmaceutical and fine chemical industries. In many instances, the quality of the final product has been insensitive to the optical purity of the feedstock. However, in some cases, the chemical and optical purity of the final product has depended, in part, upon the optical purity of the feed stock.

One stereoisomeric drug having one enantiomer which shows a different biological activity in humans than the other enantiomer is d,l-propranolol. l-propranolol acts as a beta-blocker. d-propranolol lacks such activity.

In some instances, one of the enantiomers is toxic while the other enantiomer is benign. For instance, when a d-isomer was removed from d,l-carnitine in a drug composition, doctors could no longer observe symptoms of myasthenia gravis. Symptoms had been observed, however, in patients taking the racemic mixture of d,l carnitine.

One other example is thalidomide. It is well known that ingestion of R,S-thalidomide in the 1950's by pregnant women led to the birth of children with phocomelia and other embryopathies. It was subsequently found that the R enantiomer of thalidomide is teratogenic and toxic in an animal model while the S enantiomer of thalidomide is neither teratogenic nor toxic in that model. Unfortunately, no benefit is found in humans of using the S enantiomer of thalidomide over the R enantiomer because humans morph the pure S form to a racemic mixture of R,S-thalidomide. It is still unknown which enantiomer of thalidomide is toxic in humans. Therefore, thalidomide use is prohibited in most cases in the United States.

Because enantiomers have radically different biological activity, the FDA has developed a set of rules governing the development of stereoisomeric drugs. These rules can be found at the FDA website. Specifically, the FDA requires that the enantiomeric composition of a drug should be known. That is, the stereochemical identity, strength, quality, and purity should be known in the final product. The FDA has further stated that "appropriate manufacturing and control procedures should be used to assure stereoisomeric composition of a product, with respect to identity, strength, quality and purity." Thus, pharmaceutical feedstocks, and fine chemical feedstocks used to formulate products which come under the FDA regulatory power, must be produced with utmost concern for the chirality of the molecules.

One group of chemicals that is rich in stereoisomers is the group comprising carbohydrates. Conventional carbohydrate chemistry for extracting sugars from sugar cane pulp, bagasse, or sugar beet biomass requires using large amounts of caustic and hydrochloric acid to hydrolyze the cellulose and hemicellulose polymer backbone. In the extraction, the mixed carbohydrate biomass is initially placed into a caustic solution where it forms ellipsoidal aggregates. The typical formulation calls for approximately 100 pounds of caustic for each pound of hemicellulose/cellulose carbohydrate mixture. This extraction step is accompanied by disposal problems. Since the ellipsoidal aggregates are only weakly permeable to aqueous solutions, the hydrolysis process must be performed at high temperatures and for an extended period of time.

What occurs is thermal degradation of the exterior of the ellipsoidal aggregate before the hydrolysis reaction has traversed the radius of the aggregate. The degradation results in a diminished yield and a need to separate the degraded carbohydrate from the hydrolyzed hemicellulose/cellulose mixture. Conventional extraction requires a significant destruction of raw material due to thermal decomposition of the carbohydrate and environmental damage resulting from disposal of caustic and acidic process chemicals.

SUMMARY OF THE INVENTION

One embodiment of the present invention includes a process for extracting a stereoisomer from biomass. The process includes providing biomass and subjecting the biomass to instantaneous pressurization and depressurization in a manner effective to separate lignin, hemicellulose and cellulose in the biomass. The process also includes hydrolyzing the hemicellulose to form hemicellulose hydrolysates. One or more stereoisomers is separated from the hemicellulose hydrolysates using chromatography.

Another embodiment of the present invention includes a system for obtaining monosaccharides, oligosaccharides and polysaccharides from biomass. The system comprises a mechanism for substantially pressurizing and depressurizing biomass to separate the biomass into hemicellulose, cellulose and lignin. The system also includes a heater for heating the hemicellulose. The system further includes a reactor/mixer for mixing sodium hydroxide with hemicellulose and for making hemicellulose hydrolysates. The system additionally includes a mechanism for selectively separating a hemicellulose hydrolysate based upon the component's exact sterisomeric identity.

One other embodiment of the present invention includes a process for extracting L-arabinose from sugar beet pulp. The process comprises providing sugar beet pulp and subjecting the sugar beet pulp to substantially instantaneous pressurization and depressurization in a manner effective to separate lignin, hemicellulose and cellulose in the beet pulp. The process also includes hydrolyzing the hemicellulose to form hemicellulose hydrolysates. L-arabinose is separated from the hemicellulose hydrolysates using chromatography.

DETAILED DESCRIPTION OF THE INVENTION

Figure 1:
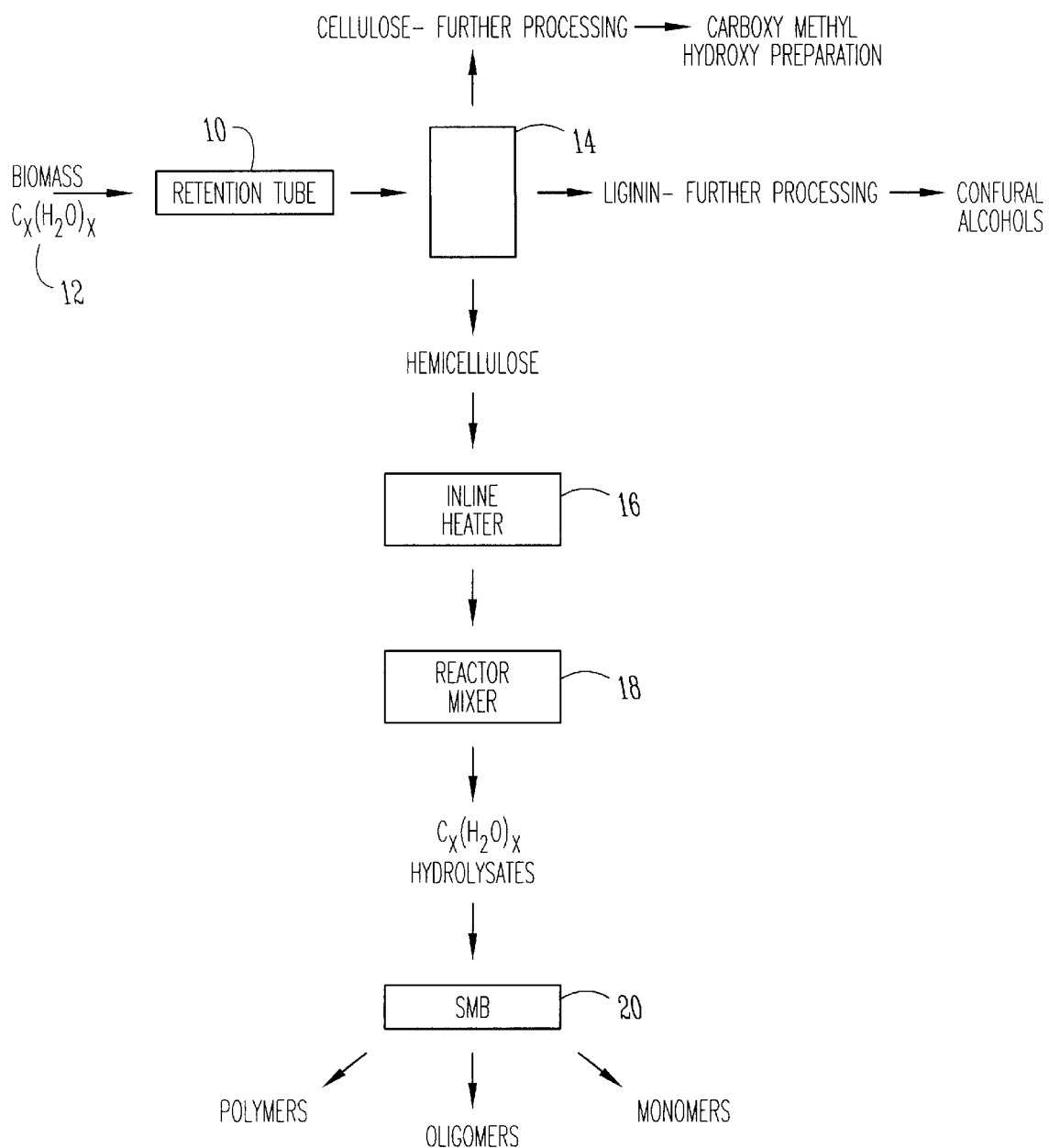
FIG. 1 is a schematic view of one embodiment of the process of the present invention.

The present invention comprises a process for extracting, separating, and purifying individual stereoisomers from biomass. The process, illustrated schematically at 10 in FIG. 1, comprises providing a source of biomass 12, subjecting the biomass to saturated steam pressurization/depressurization 14 that increases surface area of the biomass and that permits separation of lignin, cellulose, and hemicellulose components from the biomass, heating hemicellulose 16 separated from the biomass in order to hydrolyze the hemicellulose and obtain hydrolyzed monomers, oligomers and polymers, and separating polymers, oligomers, and monomers from hydrolyzed hemicellulose 18. While hydrolysates are described, it is understood that the process of the present invention is usable to extract, separate and purify substituents and derivatives of cellulose, hemicellulose and lignin. For instance, cellulose derivatives such as carboxy methyl cellulose and hydroxypropyl cellulose can be obtained using the process of the present invention. Confusal alcohols are also obtainable. Stereoisomers of the monomers are further extracted using chromatographic methods 20.

The present invention achieves high yields of stereoisomers, such as L-arabinose, using physical processes in addition to hydrolytic reactions, rather than exclusively conventional, water based, chemical extraction techniques. It has surprisingly been found that employing heat and pressure in treating biomass, such as sugar beet pulp or wood pulp, increases production rates and percent yield of stereoisomers as compared to conventional, water based, chemical extraction processes.

As used herein, "simple sugars" refer to monosaccharides and oligosaccharides which are not decomposed into smaller sugars upon hydrolysis. Monosaccharides include pyranoses and furanoses. Monosaccharides are also classified according to the number of carbons in the molecule; for example, d,l-arabinose is a heptose.

As used herein, "complex sugars" refer to polysaccharides which are carbohydrates of high molecular weight capable of being hydrolyzed into a large number of monosaccharide units. Typical polysaccharides are cellulose, lignin, hemicellulose, starch and pentosan.

An oligosaccharide is a simple polysaccharide with a known number of constituent monosaccharide units, such as 1 to 10 monomers.

The term "biomass" as used herein refers to plant materials including, but not limited to sugar beet pulp, bagasse, straw, corn stalks, corn cobs, grain husks, grass, and wood. Biomass in the form of plant materials includes cellulose and hemicellulose, both of which are polysaccharide, and lignin. Cellulose molecules are linear and unbranched glucose polymers with a high degree of polymerization between 10 and $10^6$. Cellulose has a strong propensity to form both intermolecular and intramolecular hydrogen bonds. Cellulose is stable against degradation under most physical and chemical conditions. Hemicellulose comprises heteropolysaccharides which are formed by a variety of different monomers. Most commonly the monomers are glucose, galactose, mannose, xylose and arabinose. Hemicellulose molecules have a degree of polymerization of about $10^6$.

The term "feedstock" as used herein refers to any material supplied to a device, machine, or processing plant.

The biomass used in the process of the present invention may be obtained from a variety of processes that extract products from wood, sugar beets, corn, soy, wheat and any other plant matter. The biomass is subjected to a particle size of reduction to a size of chips or finer, such as a size of sawdust, using conventional particle reduction equipment. The smaller the size, the easier it is to mechanically handle the biomass. Smaller sized particles have a greater surface area and are more amenable to chemical reaction. Also, desired processing temperatures are reached more rapidly when using smaller particles.

In one embodiment, the biomass is fed to a hopper. The biomass may optionally be sprayed with water either before transfer to the hopper or while in the hopper. The biomass exits from the bottom of the hopper into a conveying feeder which contains a conveying mechanism such as a feed screw driven by a variable feed drive. The feed screw or other conveying mechanism feeds the material into a compacting feed tube and then into a pressurized retention tube, where the biomass particles are formed into a solid plug of material. The solid plug is compressed by surface pressures of up to 2000 psi.

The biomass is mechanically compacted prior to its introduction into the digester. The biomass is desirably in a moistened condition. The mechanical compaction removes air from the material prior to its introduction to steam pressurization. Air is undesirable because oxygen in the air tends to oxidatively degrade the biomass. Air also exerts a partial pressure and retards temperature and pressure equalization within the reactor.

Steam pressurization, within the pressurized reaction vessel, is typically operated with automatic pressure and temperature control systems. The partial pressure of any air pockets decreases steam pressure and temperature in the reactor below a preselected value. Compaction, followed by processing conditions discussed below, causes a degree of fibrillation of the biomass. Fibrillation of biomass assists in the heat transfer within and around the material.

Next, the biomass particles are disintegrated by steam pressure treatment and defibrination. In particular, the particles are treated with saturated steam at a temperature of from about 160 to 230 degrees Centigrade for a period of time from 2 minutes to 4 hours. The biomass is disintegrated by this steam treatment. In general, the lower the temperature used, the longer the duration of treatment should be.

Biomass disintegrated this way is then, subsequently, lixiviated with an aqueous solution of alkali. The concentration of NaOH is typically no greater than about 4% by weight.

The biomass mixture contains between 1 and 20 grams of water per gram of dry biomass and preferably about 16 grams of water per gram of dry biomass. In one embodiment the biomass mixture contains between 2 and about 50 grams of calcium hydroxide per 100 grams of dry biomass and preferably contains 30 grams of calcium hydroxide per 100 grams of dry biomass. In another embodiment the biomass mixture contains between 2 and 50 grams of alkali, hydroxide of sodium or hydroxide of potassium, per 100 grams of dry biomass.

The steam pressure treatment is performed in either a continuous stream or a batch type steam pressure reactor. In one embodiment, the reactor is manufactured by Stake Technology Ltd. Of Ottawa, Canada. One particular device is described in U.S. Pat. No. 4,136,207, which issued Jan.

23, 1979, and which is herein incorporated by reference. The steam pressure treatment is performed in the reactor vessel. The reactor vessel is maintained at a pressure that is between about 200 and 450 psig. The temperature in the reactor is maintained between about 390° F. and 460° F. The biomass is fed intermittently for some embodiments and continuously for other embodiments. By varying the biomass stream but maintaining the reactor vessel conditions, the method of the present invention introduces an efficiency to the process, by avoiding ramp up and ramp down conditions within the reactor vessel.

The biomass is introduced into the reaction vessel in a manner that forms a solid plug at the inlet of the vessel. In one embodiment, the solid plug is formed in a device, such as a retention tube. The biomass plug prevents a loss of pressurization in the vessel. The combination of the biomass plug and constant pressurization permits instantaneous steam penetration of the biomass within the reaction vessel, and thus permits better control of processing times.

The biomass is processed at the steam temperatures described for a period of at least about 15 seconds and for some embodiments, at least about 5 minutes. The maximum time is about one hour.

After cooking, the biomass is cooled and depressurized substantially instantaneously. The biomass is in a moisture saturated condition. The biomass is subjected to sudden and substantially instantaneous decompression and adiabatic expansion, e.g. by discharging a small quantity of cooked biomass into ambient conditions.

The process of instantaneous pressurization and de-pressurization separates the biomass into components of lignin, cellulose and hemicellulose. The hemicellulose product is separated from the cellulose product and lignin product by techniques known in the art. It is further contemplated that the cellulose product is separated from the lignin product by techniques in the art.

Once the hemicellulose is extracted from the biomass, the hemicellulose is heated in a steam heater, such as a Komax steam heater and then is hydrolyzed in a static mixer, such as a Komax reactor/static mixer, manufactured by Komax Systems, Inc., of Long Beach, Calif. One reactor/static mixer embodiment is described in U.S. Pat. No. 6,027,241, which is herein incorporated by reference. The reactor/static mixer is, in one embodiment, constructed so that an additive, such as sodium hydroxide is added countercurrent to the main fluid stream. The heater and mixer comprise a heater—mixer system.

Within the reactor, at approximately 329° F. hemicellulose undergoes a phase transition, depending upon the moisture content, from a solid to a non-Newtonian fluid, somewhat like tooth paste. At temperatures higher than approximately 500° F., depending upon moisture content, the hemicellulose begins to pyrolize. Furthermore, the xylan component of the hemicellulose is degraded at temperatures above 428° F. Hence, to preserve the quality of the hemicellulose product stream, the hemicellulose exposure to temperatures above 356° F. should be as short as possible. The in-line reactor heater—static mixer system raises the temperature of the hemicellulose to between 329° F. and 347° F. The time to bring the temperature within this range is typically less than about 10 seconds to about 20 seconds.

Once heated, the hemicellulose is reacted with NaOH in the reactor/static mixer. The static mixer accepts the hemicellulose, a high viscosity stream and NaOH, the low viscosity stream. The NaOH is injected into the high viscosity stream, mixed by static mixing and a chemical reaction occurs between the alkali and the hemicellulose. In particular, the NaOH hydrolyzes the hemicellulose. The process of the present invention, unlike conventional sugar extraction processes, does not rely upon chemical reactions for extraction. Instead, the process of the present invention utilizes both sophisticated mechanical separation, occurring in the static mixer, coupled with NaOH addition for hydrolysis, for extraction and formation of hydrolysates.

The hydrolysates are separated by a simulated moving bed adsorptive separation technology, hereinafter referred to as a "SMB." The SMB is performed using chiral stationary phases. Chiral stationary phases are described in U.S. Pat. Nos. 5,254,258 and 5,290,440. The chiral stationary phases separate stereoisomers of monomers such as L-arabinose from each other. The SMB is usable to separate any stereoisomers.

The SMB comprises an apparatus for performing a continuous countercurrent moving bed high pressure liquid chromatographic separation of a multicomponent feedstream which comprises a plurality of serially interconnected adsorbent chambers with each adsorbent chamber having an inlet and an outlet on opposite ends of the chamber and adapted to contain a quantity of a selective adsorbent; a feed stream header line; a desorbent stream header line; a raffinate stream header line; an extract stream header line; a set of valves for each adsorbent chamber, with each set of valves comprising a first valve which controls the flow of a raffinate stream from the apparatus; a second valve which controls the flow of both the desorbent stream and the extract streams; a third valve which controls the flow of the feed stream between the feed stream header line and an specific adsorbent chamber; a fourth valve which controls the flow of fluid circulating between the interconnected adsorbent chambers; and, a feed valve flush line which directly connecters a port on the third valve to a port on the fourth valve.

Figure 2A:
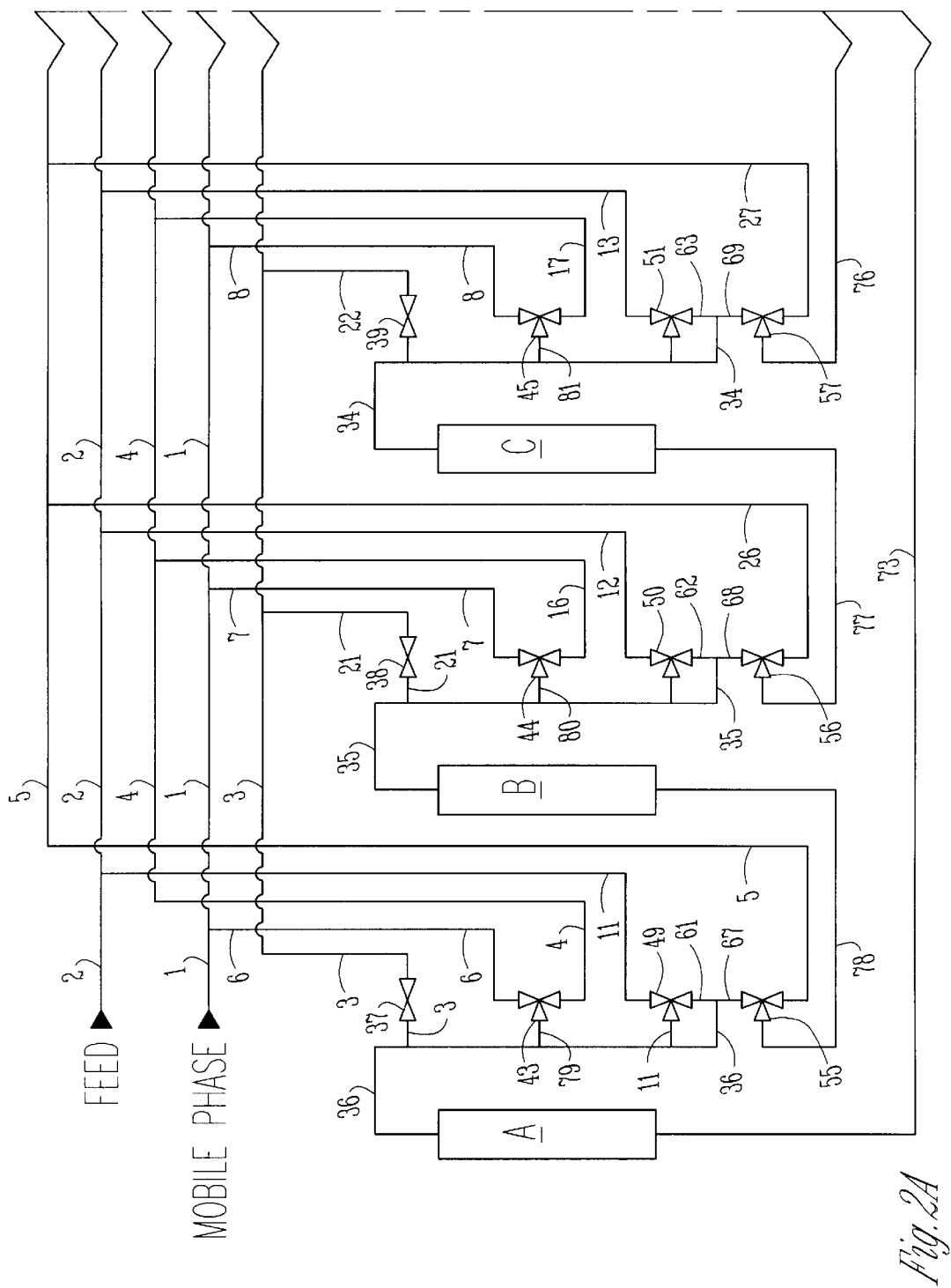
FIG. 2A illustrates one embodiment of an SMB used in the process of the present invention.
Figure 2B:
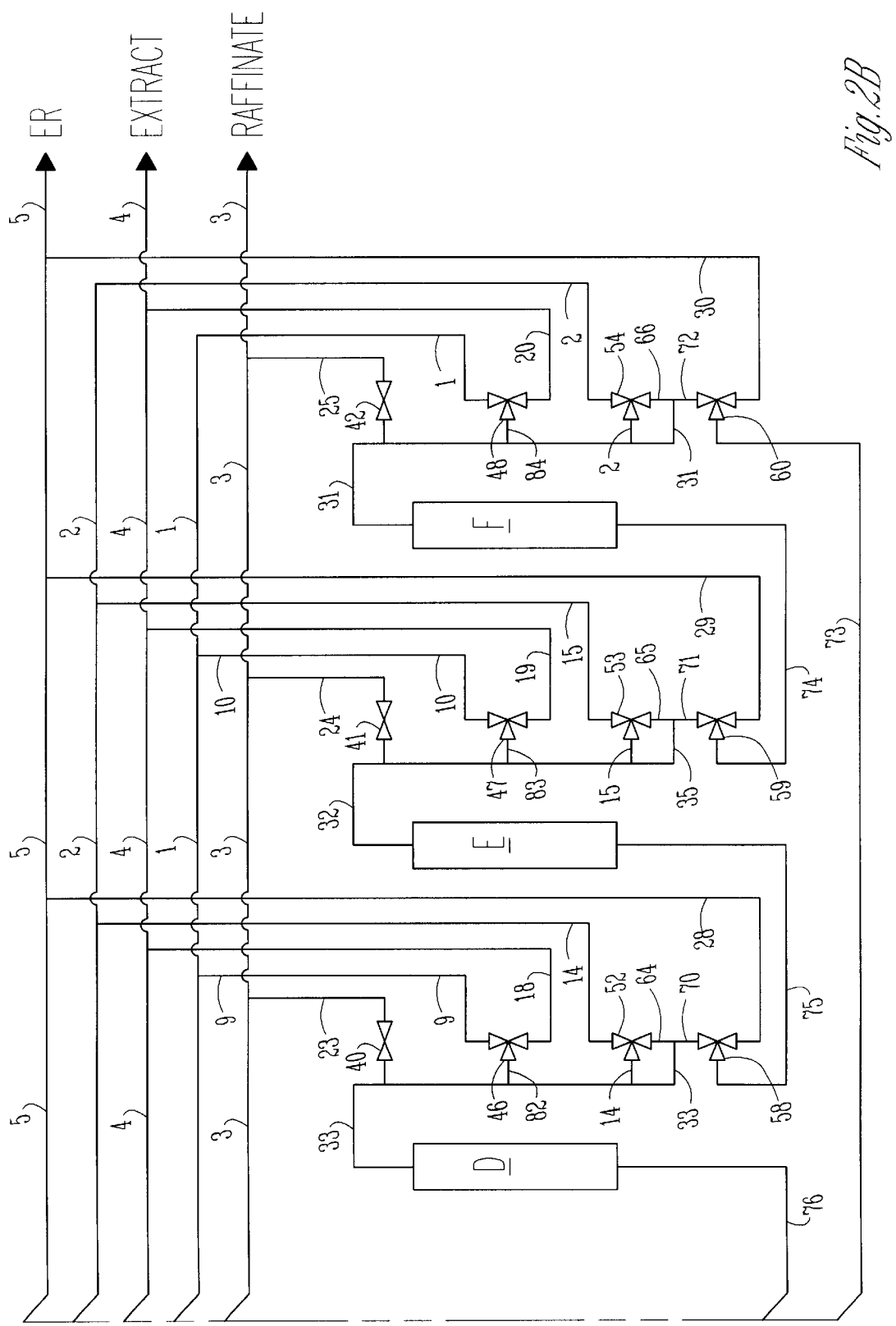
FIG. 2B illustrates one embodiment of an SMB used in the process of the present invention.

One simulated moving bed is described in U.S. Pat. No. 6,004,518, which is incorporated herein by reference. One embodiment of an SMB is illustrated generally in FIGS. 2A and 2B. FIGS. 2A and 2B illustrate the transfer lines, adsorbent chambers and valves employed in an apparatus containing six adsorbent chambers. The lines between chambers "C" and "D" in the middle of the apparatus are zigzagged to represent the other adsorbent chambers, transfer lines and associated sets of valves that could be present at this location in the apparatus to increase the number of adsorbent chambers as desired. For purposes of presentation in the limited confines of one sheet of drawing, the depiction of the apparatus is limited to the six adsorbent chambers of FIGS. 2A and 2B. The nomenclature of components of the apparatus and the reference characters for each is set out in Table 1.

TABLE 1

| 1 | Mobile phase header |
|---|---|
| 2 | Feed header |
| 3 | Raffinate header |
| 4 | Extract header |
| 5 | (Extract) recycle header |
| 6–10 | Mobile phase feed lines |
| 11–15 | Feed stream feed lines |
| 16–20 | Extract stream withdrawal line |
| 21–25 | Raffinate stream withdrawal line |
| 26–30 | Recycle stream withdrawal line |
| 31–36 | Chamber inlet line |
| 37–42 | Raffinate valve-two-way |
| 43–48 | Mobile phase/extract valve-three way |

TABLE 1-continued

| | |
|---|---|
| 49–54 | Feed valve-three way |
| 55–60 | Recycle valve-three-way |
| 61–66 | Feed valve flush line |
| 67–72 | Recycle valve outlet valve |
| 73–78 | Chamber outlet line |
| 79–84 | Inlet line branch line |

Referring to FIG. 2A, the hemicellulose hydrolysate stream enters through feed header line 2. The feed header line "feeds" into chamber F. Several feed lines 11–15 feed off of the header to carry hemicellulose hydrolysate to adsorbent chambers A–F. The flow of hydrolysate through line 2 is substantially continuous. However, there is flow through only one of the feed stream lines 11–15 at any point of time during the operation of the apparatus. This is because feed is only passing into the entrance of one of the adsorbent chambers at any point of time during a cycle of operation. In a similar manner, a mobile phase stream, a desorbent stream, is simultaneously charged to the apparatus via line 1. Line 1 also extends to the right-hand side of the apparatus with a terminal portion of header line 1 acting as the mobile phase delivery line to chamber F. Individual mobile phase feed lines 6–10 branch off of the mobile phase header line 1 and deliver the mobile phase to one of the other individual adsorbent chambers A through F. As with the feed stream, the mobile phase flows through the header line are substantially continuous. However, the mobile phase only flows through one of the feed lines 6–10 at any point of time during the operation of the process.

The point at which the feed stream enters an adsorbent chamber marks the beginning of the adsorption zone or Zone I. Zone I continues to the point at which the remaining components of the feed stream are withdrawn as the raffinate stream. The point at which the mobile phase (desorbent) enters an adsorbent chamber marks the beginning and upstream end of the desorption zone or Zone III. Zone II is a purification zone between the point at which the extract stream is removed and the feed stream is passed into the apparatus. Zone IV separates the adsorption and desorption zone and lies between the raffinate withdrawal point and the mobile phase injection point.

As an example of this zone nomenclature, if the apparatus comprises 16 adsorbent chambers, referred to as chambers A through P, a feed stream may be charged to the inlet of adsorbent chamber H and passed through 6 adsorbent chambers before being removed from the apparatus at the outlet of adsorbent chamber C as the raffinate stream withdrawn from the apparatus. The mobile stream and desorbent stream are charged to the inlet of adsorbent chamber A with the resultant extract stream removed from the outlet of adsorbent chamber O, with this forming an extraction zone or Zone III of the apparatus comprising 3 adsorbent beds. An external recycle stream is withdrawn fro the outlet of adsorbent chamber B located one chamber downstream from the point of removal of the raffinate.

In FIG. 2, at some time, the feed stream from the header line 2 flows downward through feedline 11 into the feed valve 49 associated with adsorbent chamber A. With the three-way feed valve 49 being in an open position, the feed stream emerges from the valve and continue to flow through the terminal portion of line 11 to the junction with the chamber inlet line 36. Purging this terminal portion is a key to the apparatus described. The feed stream flows upward through line 36 to the inlet of adsorbent chamber A which is at the top of the chamber. The feed stream enters the adsorbent chamber A and the actual adsorptive separation begins. The different components of the feed stream are retained at different rates by the adsorbent with some components such as solvent components being essentially unretarded. The components of the feed stream are therefore separated such that the different components have different concentration profiles in the stream flowing through the adsorbent chamber. The partially fractionated feed stream emerges fro the bottom of the adsorbent chamber A and is carried by the chamber outlet line 73 to the inlet port of the three-way recycle valve 60 of chamber F. This three-port valve allows the withdrawal at specific points in time of a small quantity of liquid referred to as external recycle. This liquid is basically high-purity solvent or mobile phase material that is trapped in a "dead bed" of the system during operation and that is withdrawn for recovery and recycled. The optional external recycle flow is therefore a pulse collected once during each change in the position of the valves used in the apparatus. The external recycle material is collected for reuse in the process if this is allowed by the procedures which govern the operation of the system. The recycle may be reusable as mobile phase material.

The fluid stream removed from adsorbent chamber A 10 through line 73 passes through the recycle valve 60 into the recycle valve outlet line 72 and is divided into two separate portions. The major portion flows into the adsorbent chamber inlet line 31 and a smaller port flows through the feed valve flush line 66. The portion of the circulating liquid flowing through line 66 pushes any residual feed stream material from the internal volume of the feed valve 54 and from the small delivery section of feed line 2 between the feed valve 54 and from the small delivery section of feed line 2 between the feed valve 54 and chamber inlet line 31. Alternatively, a small porion of the fluid otherwise removed as the external recycle may be allowed to flush valve 54 and feed line 31. The advantage of this is that the line between the valve and chamber inlet line 31 are filled with mobile phase liquid and neither extract profiles which had been partially developed in the preceding adsorbent chamber. The material flowing through the feed inlet valve for the purposes of flushing the valve and the feed line is admixed with the rest of the material flowing through line 31 and continues to the inlet of the adsorbent chamber F.

Other valves in each set of valves for adsorbent chambers A and F are in a closed position. Other fluids are not withdrawn or passed into the apparatus through any valve in either set of valves.

The feed valve associated with a particular adsorbent chamber is always positioned to be open to receive flush fluid except for a short period of time during which feed is flowing through the valve. Thus, the valve and the delivery section of the feed stream line contain fluid having the same composition as that flowing past the junction of the feed stream line with the chamber inlet line.

Two options exist for the operation of the feed valve after sufficient fluid has been passed through it to completely flush the feed line. First as set out above, the valve may be allowed to stay in this position with fluid from line 73 continuing to flow through both lines 66 and 31 until feed again enters through valve 54. Alternatively, the valve may be moved to block the flow through line 66 at some time before it is required to move the valve to allow the feed stream to enter the apparatus.

As the process stream continues to flow through adsorbent chamber F, the compounds are further separated to produce a more defined set of concentration profiles in the flowing liquid. The effluent of the adsorbent chamber F is removed in the chamber outlet line 74 and passed into the recycle valve 59. The recycle valve 59 is open and allows all the fluid to travel into outlet line 71. One portion of the fluid then flows into the chamber inlet line 32 and passes upward in the figure. A second portion flows through line 65 and valve 53, which directs into the terminal delivery section of line 15. The two portions then rejoin and flow through line 32. Prior to reaching the inlet of chamber E, the fluid is removed through the raffinate withdrawal line 24. The fluid being removed in this manner basically comprises the less readily retained components of the feed stream and any associated solvent components. The raffinate stream passes through the open two-port raffinate valve 41 and continues through the raffinate stream withdrawal line 24 to the junction with the raffinate header line 3. The raffinate stream is then removed from the right-hand end of the Figure through header line 3. At this point in time, two of the four valves in this set of valves associated with adsorbent chamber E, that is, valves 47 and 53, are in a closed position and there is no flow through these valves other than flush liquid in valve 53. Adsorbent chambers A and F therefore form adsorption Zone I.

Each adsorbent chamber has a chamber inlet line 31–36 and a chamber outlet line 73–78. Also associated with each chamber is a set of four valves comprising three three-way valves and one two-way valve. The three-way valve allows a central or common conduit to be selectively connected to either of the remaining ports. The two-way valves are raffinate valves 37 through 42. The three-way valves include the mobile phase/extract valves 43–48, the feed valves 49–54 and the recycle valves 55–60.

Figure 3A:
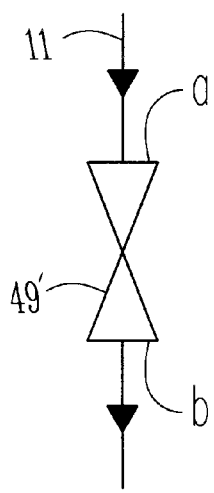
FIGS. 3A and 3B illustrate feed valves used in the SMB process.
Figure 3B:
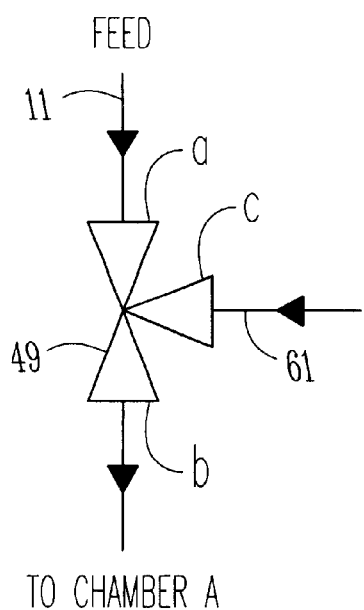

Feed valves are illustrated in FIGS. 3A and 3B. The feed stream is brought to the valve in line 11 and flows through the valve only when it is in an open position. In one embodiment, this is the only flow through the valve. The outlet line is stagnant when there is no flow of feed through this valve.

The flow rates of the feed stream, desorbent stream and extract stream are all regulated on the basis of set flow rates, which are held constant. The raffinate stream rate is on pressure control. A flow rate control valve, not shown, regulates the effluent rate of the extract stream of header line 4 to be less than the feed rate of the desorbent stream of header line 1. The outlet rate of the raffinate stream is set by a pressure control valve also not shown. The rate of flow of the raffinate is therefore automatically equal to the two input streams minus the extract stream.

At this time, a portion of the extract material flowing through the chamber inlet line equal to the difference between the desorbent and extract stream flow rates is charged to the inlet of the purification zone, Zone II, and is referred to as Zone II material. The function of liquid flowing through this zone is to remove raffinate material from the nonselective pore volume of the adsorbent and chambers of the purification zone. This material flows through any interconnecting lines leading into the inlet of the next adsorbent chamber. The liquid may flow through two or more adsorbent chambers. It then joins the feed material and flows into the inlet of the first chamber of the adsorption Zone, Zone I. The raffinate material flushed from the purification zone therefore flows into the adsorption zone. The raffinate components in the material being flushed into the adsorption zone in this manner merely travel through the adsorption zone and do not interfere with the adsorption of the desired component from the feed stream.

The adsorbent particles may be in the form of any shape, sphere or monolith, and of any size suitable for use in high pressure liquid chromatography. The composition of the adsorbent is not a controlling factor, but, for some embodiments, can be controlling. All of the chambers contain the same adsorbent which may be a commercially available adsorbent.

Operating conditions include a temperature of about 20 to 100 degrees Centigrade. Pressure ranges form 700 to 25,000 kPa. Flow rates are effective to produce dry product of about 1000 kg/day.

The mobile phase or desorbent may be any compound or mixture of compounds which is given the desired phase at the chosen operating conditions, does not react with either the adsorbent or the compounds being separated and is tolerable or totally separable from the intended products. The desorbent contains a chiral moiety.

With the process of the present invention, the hydrolysate mixture may be separated on the basis of monomer, oligomer, and polymer in a single step and then separated on the basis of stereoisomer, i.e. optical or chirally pure monomer separation, in a second step. In another embodiment, the hydrolysate mixture may be separated and a desired stereoisomer may be extracted in a single step.

In one particular embodiment of the process of the present invention, L-arabinose is extracted from biomass, the source of which is sugar beet pulp. The sugar beet pulp is transported from a sugar beet process stream to a chopper or grinder and then to a hopper. From the hopper, the chopped or ground beet pulp is transported to a retention tube by a conveyor such as a feed screw. Within the retention tube, the sugar beet pulp is formed into a solid plug.

The solid plug is transferred to the steam pressurized reactor where it is disintegrated by defibrination. The reaction temperature is 160 to 230 degrees Centigrade and the time period is about 2 to 10 minutes. Upon disintegration, the biomass is substantially instantaneously depressurized by removal from the reaction.

This process separates the cellulose, lignin and hemicellulose from each other. The hemicellulose is separated and is passed through the heater—reactor/static mixer system described above. Arabinose is one of the sugar hydrolysates produced.

In one embodiment of the process of the present invention, sugar products obtained by SMB are crystallized. In one embodiment, the crystallization is performed using a low intensity ultrasonic agitation. It is believed that this crystallization produces a product wherein crystals have few inclusions, are uniform in shape, in size, in density and in purity.

In one embodiment, the L-arabinose is separated from other monomers using SMB methods described herein. In another embodiment, the L-arabinose is separated from a mixture of hemicellulose hydrolysates.

The present invention may be embodied in other specific forms without departing from its spirit or essential characteristics. The described embodiments are to be considered in all respects only as illustrative and not restrictive. The scope of the invention is, therefore, limited only by the appended claims rather than by the foregoing description. All changes which come within the meaning and range of functional equivalency of the claims are to be embraced within their scope.

What is claimed is:

1. A process for extracting one or more hemicellulose hydrolysate stereoisomers from biomass, comprising:

providing biomass;

subjecting the biomass to substantially instantaneous pressurization and de-pressurization in a manner effective to separate lignin, hemicellulose and cellulose in the biomass;

hydrolyzing the hemicellulose to form hemicellulose hydrolysates; and separating one or more stereoisomers from the hemicellulose hydrolysates using adsorption.

2. The process of claim 1 and further comprising reducing size of the biomass prior to pressurization.

3. The process of claim 1 and further comprising compacting the biomass prior to pressurization.

4. The process of claim 1 wherein the biomass provided is one or more of wood, beets, corn, soy, wheat, and plant biomass.

5. The process of claim 1 wherein the stereoisomer separated is L-arabinose.

6. The process of claim 1 wherein the biomass is subjected to pressurization at a temperature of about 390 to 460 degrees Fahrenheit.

7. The process of claim 1 wherein the biomass is subjected to pressurization for not more than about 10 minutes.

8. The process of claim 2 wherein the biomass is reduced to a size of sawdust.

9. The process of claim 1 and further comprising feeding the biomass for pressurization continuously.

10. The process of claim 1 and further comprising adding moisture to the biomass before pressurization.

11. The process of claim 1 wherein the hydrolysis occurs in a reactor/static mixer.

12. The process of claim 11 wherein the hydrolysis occurs at about 329 to 347 degrees Fahrenheit, under pressure.

13. The process of claim 11 wherein sodium hydroxide is added to the static mixer in a flowpath that is counter-current to the flow of hemicellulose.

14. The process of claim 12 wherein the stereoisomer separation is performed with co-polymer beads.

15. A system for obtaining monosaccharides, oligosaccharides and polysaccharides from biomass, comprising:

a mechanism for substantially instantaneously pressurizing and de-pressurizing biomass to separate the biomass into hemicellulose, cellulose, and lignin;

a heater for heating the hemicellulose to liquefy the hemicellulose;

a reactor/mixer for mixing a sodium hydroxide with hemicellulose and for making hemicellulose hydrolysates; and a mechanism for selectively separating a hemicellulose hydrolysate based upon the component's stereoisomeric identity.

16. The system of claim 15 wherein a biomass comprises sugar beet pulp.

17. The system of claim 15 wherein the hemicellulose product does not enter a glassy state but is liquefied.

18. The system of claim 15 wherein the hemicellulose product is free of caramelized hemicellulose product.

19. The system of claim 15 wherein the sodium hydroxide is in the aqueous phase.

20. The system of claim 15 wherein the hemicellulose hydrolysates comprise d-arabinose, l-arabinose, d-xylose, l-xylose, d-glucose, l-glucose, and any other racemic carbohydrates.

21. The system of claim 15 wherein the hemicellulose hydrolysates comprise polygalacturonic acid.

22. The system of claim 15 wherein the hemicellulose hydrolysates comprise any backbone polymer.

23. The system of claim 15 and further comprising a mechanism which receives the hemicellulose hydrolysates.

24. The system of claim 15 wherein the hemicellulose hydrolysates are separated into optically pure products.

25. A process for extracting L-arabinose from sugar beet pulp, comprising:

providing sugar beet pulp;

subjecting the sugar beet pulp to substantially instantaneous pressurization and de-pressurization in a manner effective to separate lignin, hemicellulose and cellulose in the sugar beet pulp;

hydrolyzing the hemicellulose to form hemicellulose hydrolysates; and separating L-arabinose from the hemicellulose hydrolysates using chromatography.

26. The process of claim 24 wherein the L-arabinose is produced at a rate of at least 1000 pounds per day.

27. The process of claim 1 and further comprising extracting derivatives and substituents from cellulose and lignin.

28. The process of claim 1 and further comprising crystallizing the separated product.

29. The process of claim 28 wherein the crystallizing is performed using a low intensity ultrasonic agitation.

* * * * *